United States Patent [19]

Okado

[11] 4,445,167
[45] Apr. 24, 1984

[54] INVERTER SYSTEM

[75] Inventor: Chihiro Okado, Tokyo, Japan

[73] Assignee: Tokyo Shibaura Denki Kabushiki Kaisha, Kanagawa, Japan

[21] Appl. No.: 421,346

[22] Filed: Sep. 22, 1982

[30] Foreign Application Priority Data

Oct. 5, 1981 [JP] Japan .................................. 56-157400
Nov. 18, 1981 [JP] Japan .................................. 56-184684

[51] Int. Cl.³ .......................................... H02H 7/122
[52] U.S. Cl. ..................................... 363/56; 318/811; 363/41
[58] Field of Search .................. 318/599, 811; 363/41, 363/37, 56

[56] References Cited

U.S. PATENT DOCUMENTS 4,364,109 12/1982 Okado et al. ......................... 363/41

OTHER PUBLICATIONS

1980 National Convention Records S8-543 "A Measure to Counter Power Failure with Variable Power Source", Institute of Electrical Engineers of Japan; Apr. 1980; Toshio Kamifu, Tadao Goshi.

Primary Examiner—William M. Shoop
Attorney, Agent, or Firm—Stevens, Davis, Miller & Mosher

[57] ABSTRACT

In a PWM voltage type inverter system comprising: a rectifier converting an AC power from an AC power source into a DC power, an inverter bridge converting the DC power from the rectifier into an AC power of a variable frequency to supply it to an AC motor, and a conduction control circuit for controlling the conduction of arms of the inverter bridge normally in a first mode wherein it operates at a frequency determined by a frequency reference signal, a control power circuit is connected to receive the power from the AC power source and the regenerative AC power from the motor and to supply a constant voltage DC power to the conduction control circuit. When power failure is detected, the conduction control circuit is switched to a second mode, wherein it operates in such a manner as to maintain the regenerative voltage at a predetermined value. With the arrangement of the invention, the motor can be kept operating over a longer period of time upon occurrence of power failure.

8 Claims, 15 Drawing Figures

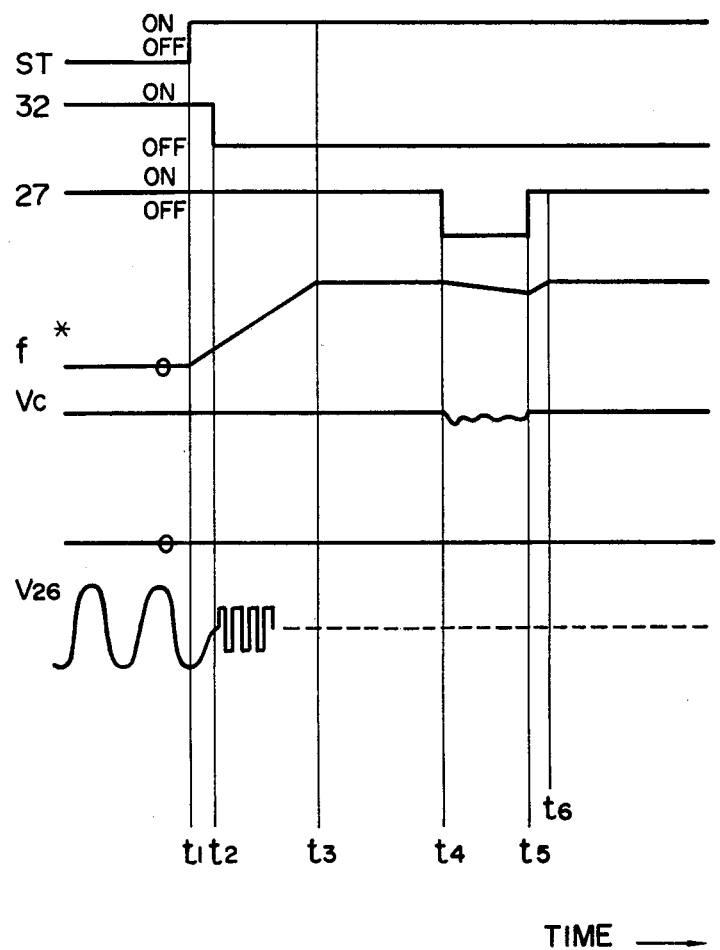

INVERTER SYSTEM

BACKGROUND OF THE INVENTION

This invention relates generally to inverter systems, and more particularly to an inverter system which is operable for a predetermined period even in a case where a power failure or a service interruption occurs.

Recently, inverters operable under variable frequency are widely used for variable speed drive of electric motors. However, where a power failure of a short duration or an instantaneous power failure occurs, and the operation of, for instance, a voltage type inverter is thereby interrupted, re-start of the inverter is difficult in that the phase angle and the voltage of the output of the inverter must be matched with those of the electric motor. Otherwise, a large current flows, resulting in the failure of re-start of the inverter system.

FIG. 1 illustrates a conventional voltage type inverter system operable in a PWM (pulse width modulation) mode.

The conventional inverter system comprises a rectifier 2 for converting an AC voltage from an AC power source 1 into a DC voltage, a smoothing capacitor 3 and an inverter bridge 4 having arms formed of transistors 41–46 and diodes 41A–46A and converting the DC voltage to three-phase AC voltages. The output of the inverter bridge 4 is used to drive an AC electric motor 5. The inverter system further comprises a control circuit 14 which delivers six outputs supplied to a corresponding one of drive circuits (only one of them being illustrated) comprising a transistor 16 having its base connected to receive one of the outputs from the control circuit 14, a pulse transformer 15 through which the output (collector) current of the transistor 16 flows, and a drive circuit 17 connected to receive the output of the pulse transformer 15 and to control a corresponding one of the transistors 41–46 of the inverter bridge 4 according to the output of the pulse transformer 15.

Power required for the control circuit 14, and transistor 16 is supplied through a control power circuit PC comprising a transformer 6 connected to the AC power source 1, a rectifier 7 for rectifying the output of the transformer 6, a smoothing capacitor 8, and a chopper type constant voltage circuit composed of a transistor 9, a reactor 10, a capacitor 11, a diode 12, and a voltage control circuit 13.

The inverter control circuit 14 is illustrated in further detail in FIG. 2. The circuit 14 includes a frequency setting device 100 comprising a variable resistor connected to the constant DC voltage from the control power circuit. Operational amplifiers 102, 103, 104, resistors 101, 106, 107, 108, 109, a capacitor 110, and a variable resistor 105 in combination constitute a well-known acceleration/deceleration restricting circuit, wherein the variable resistor 105 is used for adjusting the rate of change of the frequency. The output signal f* of the frequency control circuit is converted by a V/F converter 111 into a frequency-indicative voltage signal $f_s$ which is applied to one input of a frequency synthesizing circuit 112. A triangular wave generating circuit 113 generating a triangular wave $e_t$ to be used for PWM, is applied to another input of the frequency synthesizing circuit 112. The synthesizing circuit 112 produces PWM signals based on the signals $f_s$ and $e_t$, and controls the conducting period and ON-OFF frequency of the transistors 41–46. Since the voltage V and the frequency F of the output of the inverter is controlled in a manner in which ratio V/F is maintained constant, the control is also referred to as V/F control.

With an inverter system described above, it is, in many cases, desired to continue, even when a power failure occurs, driving the AC motor. For instance, where the AC motor is used for driving a pump in a water service system, an interruption of the operation of the AC motor might cause separation of contaminating matter which has been deposited on the internal surface of water pipes, leading to contamination of water in the pipes. To avoid such contamination, the motor driving the pump should be kept running.

When an instantaneous power failure occurs with the conventional PWM controlled voltage type inverter system, the DC voltage $V_d$ across the capacitor 3 is reduced in accordance with the commutating operation of the inverter bridge 4. When the power source voltage $V_{AC}$ is interrupted for a time period $t_1$–$t_2$ in FIG. 3, a voltage $V_{cd}$ across the capacitor 8 is reduced gradually as shown, whereas the power source voltage $V_c$ of the control circuit 14 is held substantially constant because of the presence of the chopper circuit. Thus, when the original value of the power source voltage $V_{AC}$ is recovered at the instant $t_2$, the voltage $V_{cd}$ across the capacitor 8 is brought back to the normal value, and thus operation of the inverter system is continued.

However, where the time interval $t_1$–$t_2$ of the power failure is comparatively long, the voltage $V_{cd}$ across the capacitor 8 is reduced to a level lower than the power source voltage $V_c$ of the control circuit 14, and the power source voltage $V_c$ is no longer kept constant so that the normal operation of the control circuit 14 is no longer possible.

For this reason, in the conventional voltage type inverter system operating in the PWM mode, a guaranteed power failure time (over which the system is capable of continuing operation) is set shorter than 0.5 second, and a protecting circuit is provided for interrupting the operation of the inverter upon occurrence of a longer power failure.

It is of course possible to extend the guaranteed interruption time by increasing the capacitance of the capacitors 3 and 8. However, such a solution results in increased size and cost of the inverter system.

SUMMARY OF THE INVENTION

A primary object of the present invention is to provide a PWM voltage type inverter system wherein the above described difficulties of the conventional inverter system can be substantially eliminated.

Another object of the invention is to provide a PWM voltage type inverter system which can continue operation even when a comparatively long power failure occurs.

A further object of the invention is to provide a PWM voltage type inverter system which can automatically restore its normal operation upon termination of a power failure which has interrupted the driving operation of the inverter system.

According to the present invention there is provided a PWM voltage type inverter system comprising:
a rectifier connected to an AC power source to receive an AC power therefrom and convert it into a DC power,
an inverter bridge connected to receive the DC power from the rectifier and converting it into an AC power of a variable frequency to supply it to an AC motor, a conduction control circuit for controlling the conduction of arms of the inverter bridge normally in a first mode wherein it operates at a frequency determined by a frequency reference signal, a control power circuit connected to receive the power from the AC power source and the regenerative AC power from the motor and to supply a constant voltage DC power to the conduction control circuit, service interruption detecting means for detecting the power failure of the AC power source, switching means responsive to the power failure detecting means for switching, when power failure is detected, the conduction control circuit to a second mode, wherein it operates in such a manner as to maintain the regenerative voltage at a predetermined value.

BRIEF DESCRIPTION OF THE DRAWINGS

In the accompanying drawings:

FIG. 13 is a time chart showing the operation of the system shown in FIGS. 11 and 12.

DESCRIPTION OF THE PREFERRED EMBODIMENTS

Figure 5:
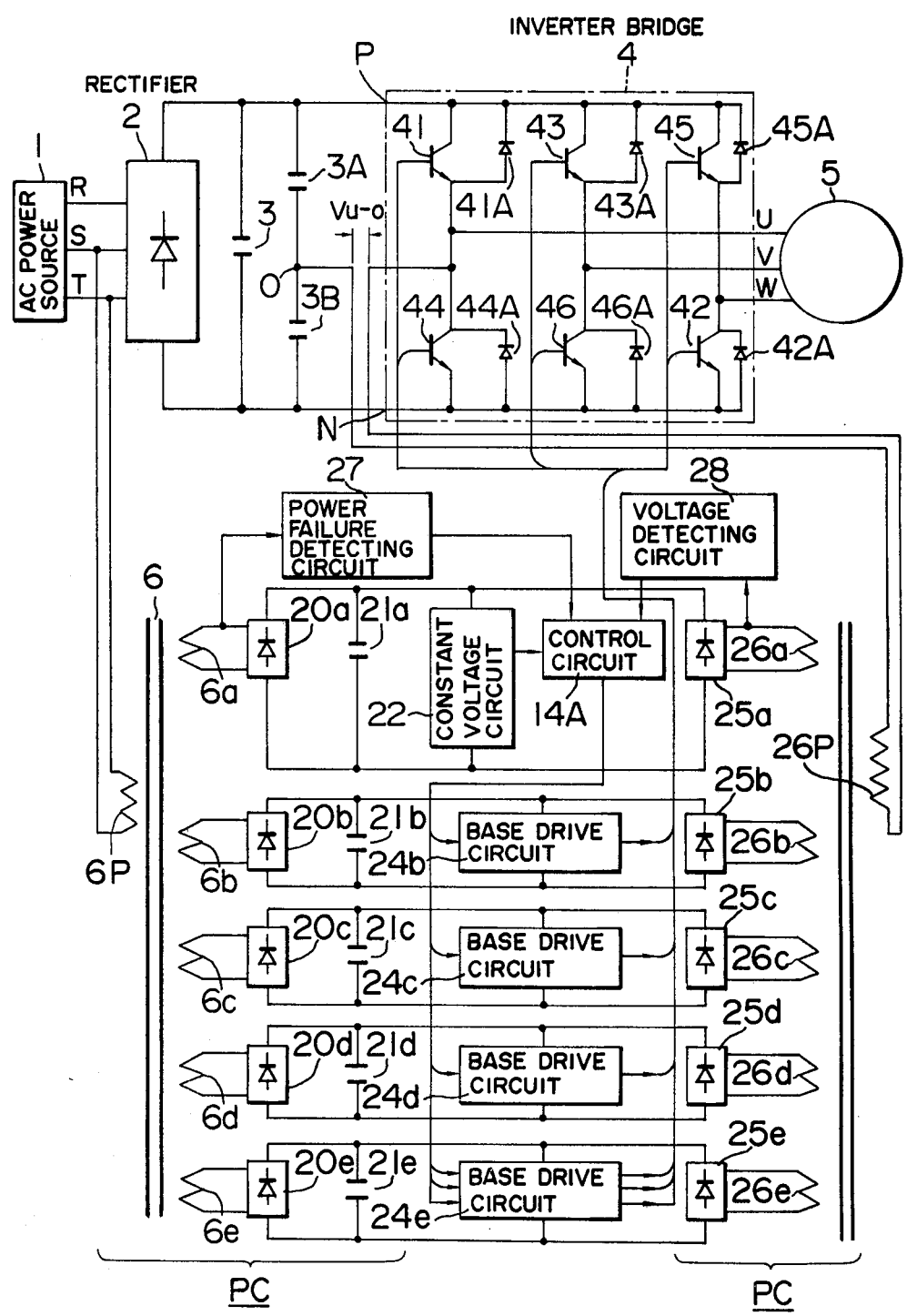
FIG. 5 is a block diagram showing an embodiment of an inverter system according to the invention.

Referring to FIG. 5, there is illustrated a general arrangement of an inverter system constituting a preferred embodiment of the invention. As does the conventional inverter system, the inverter system of this embodiment comprises a rectifier 2 connected to receive a three phase AC voltage from terminals R, S, T of an AC power source 1 and convert it into a DC voltage, a smoothing capacitor 3, and an inverter bridge 4 having its DC terminals P,N connected to receive the DC voltage from the rectifier 2 and having its three-phase AC output terminals U, V, W connected to the windings of a three-phase AC electric motor 5. A series connection of capacitors 3A, 3B having the same capacitance and connected between the DC terminals P,N provides, at the junction O of the two capacitors, a mid-potential point having a potential which is midway or average of the potentials on the terminals P,N.

The inverter system of the embodiment further comprises a control circuit 14A, base drive circuits 24b–24d which drive the bases of the transistors 41, 43 and 45 of the inverter bridge 4 under the control of the control circuit 14A, another base drive circuit 24e which drives the bases of the transistors 44, 46 and 42 in the inverter bridge 4 under the control of the control circuit 14A. A control power circuit PC of the embodiment for energizing the control circuit 14A and the drive circuits 24b–24e comprises a transformer 6 having a primary winding 6p connected to terminals S and T of the power source 1, and having five secondary windings 6a–6e. The control power circuit PC also comprises another transformer 26 having a primary winding 26p connected between the mid-potential point O and the AC terminal U. The control power circuit PC further comprises rectifiers 20a–20e converting the AC outputs from the secondary windings 6a–6e into DC power to energize the control circuit 14A and base drive circuits 24b–24e. The control circuit PC further comprises rectifiers 25a–25e converting the AC outputs from the secondary windings 26a–26e into DC power which also is used to energize the control circuit 14A and base drive circuits 24b–24e. Smoothing capacitors 21a–21e smooth out the DC voltages from the rectifiers 20a–20e and 25a–25e, respectively. A power failure detector 27 detects power failure or service interruption of the AC power source 1, and a voltage detecting circuit 28 detects the magnitude of the voltage $V_{u\text{-}o}$ between the terminal U and the mid-potential point O. As will be explained later, present between the terminal U and the mid-potential point O during the power failure is a regenerative voltage from the motor 5.

Figure 2:
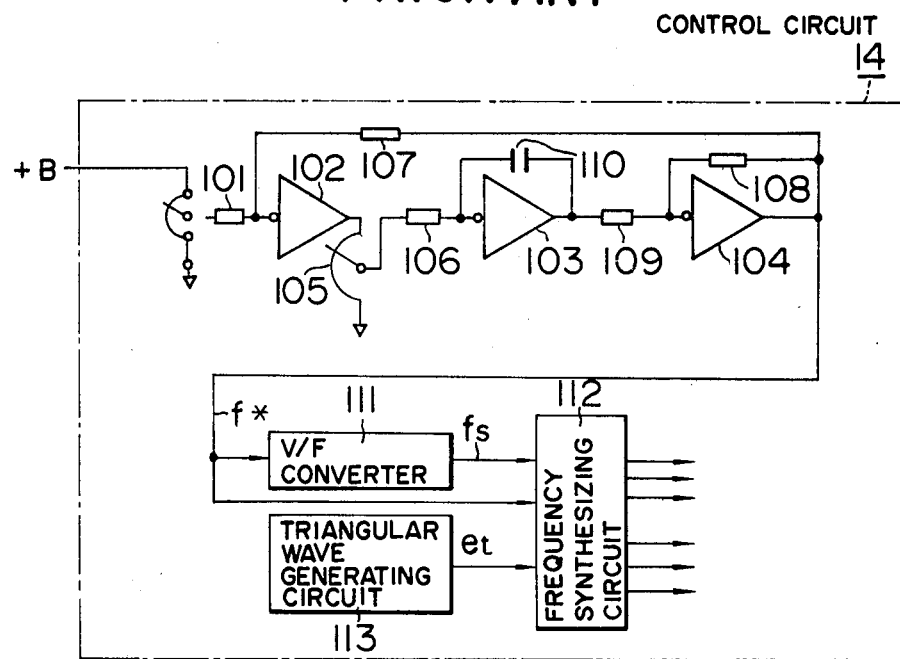
FIG. 2 is a diagram showing the internal construction of the control circuit of the system shown in FIG. 1.
Figure 3:
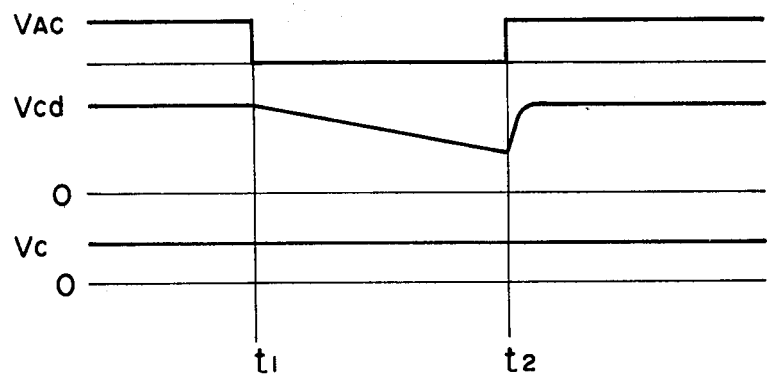
FIG. 3 is a time chart showing the operation of the system shown in FIGS. 1 and 2.
Figure 6:
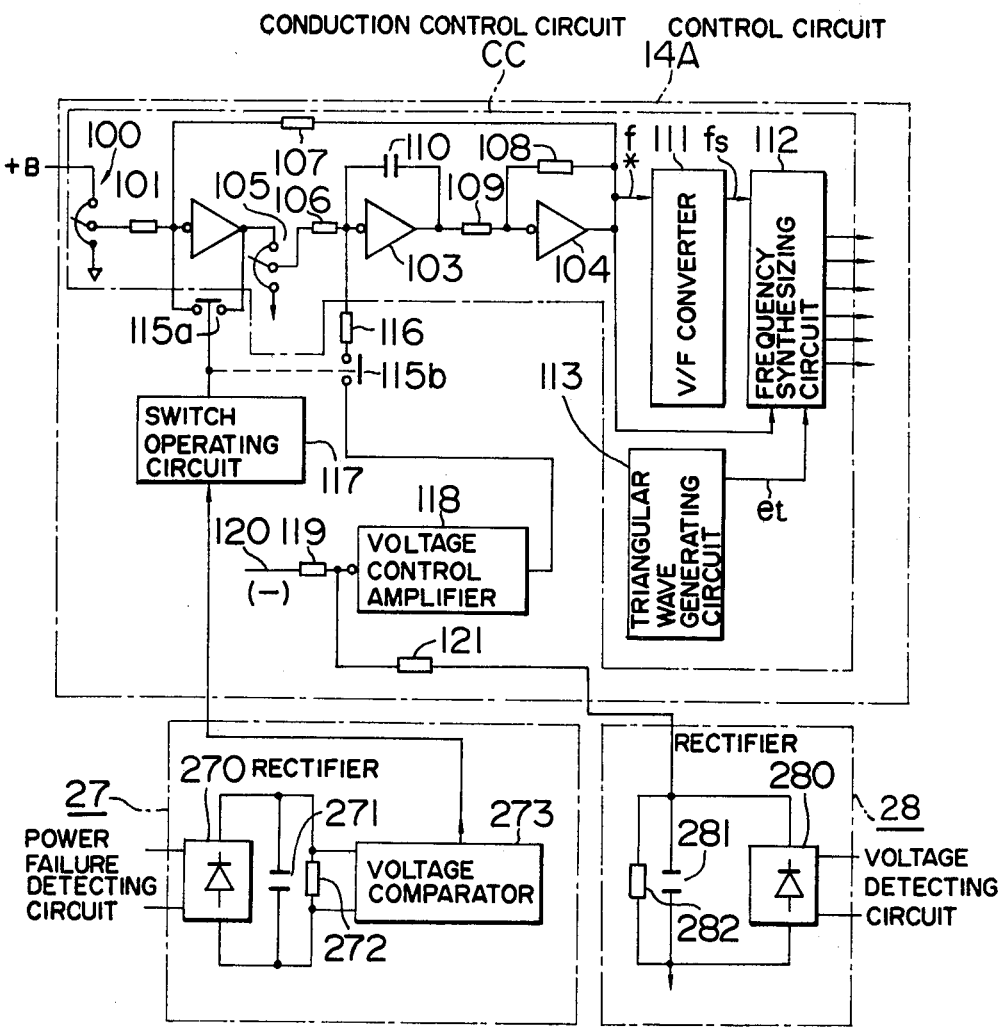
FIG. 6 is a diagram showing the internal construction of the control circuit of the system shown in FIG. 5.

FIG. 6 illustrates the control circuit 14A, power failure detector 27, and the voltage detecting circuit 28 in further detail. The control circuit 14A includes a conduction control circuit CC which has a construction similar to that of the control circuit 14 shown in FIG. 2. In addition, the control circuit 14A further comprises a switch operating circuit 117 which operates switches 117A1 and 117A2, and a voltage control amplifier 118 which is used to maintain constant the regenerated voltage which appears during power failure. Reference numerals 116, 119 and 121 designate input and output resistors associated with the voltage control amplifier 118.

The power failure detecting circuit 27 comprises a rectifier 270 connected to rectify a secondary voltage of the transformer 6 in FIG. 5, a capacitor 271 connected across the output terminals of the rectifier 270, a resistor 272 connected in parallel with the capacitor 271, and a voltage comparator 273 which detects a reduction of the voltage across the capacitor 271 to a level lower than a predetermined value. The voltage detecting circuit 28 likewise comprises a rectifier 280 which rectifies a secondary voltage of the transformer 26, and a capacitor 281 and a resistor 282 connected to the output of the rectifier 280.

The present invention utilizes PWM operation of the inverter for obtaining, during power failure, an electric power for the control circuit from the momentum of the electric motor 5, i.e., the energy of the rotating parts of the motor, so that the PWM operation of the inverter will firstly be described with reference to FIGS. 4A and 4B.

Figure 4A:
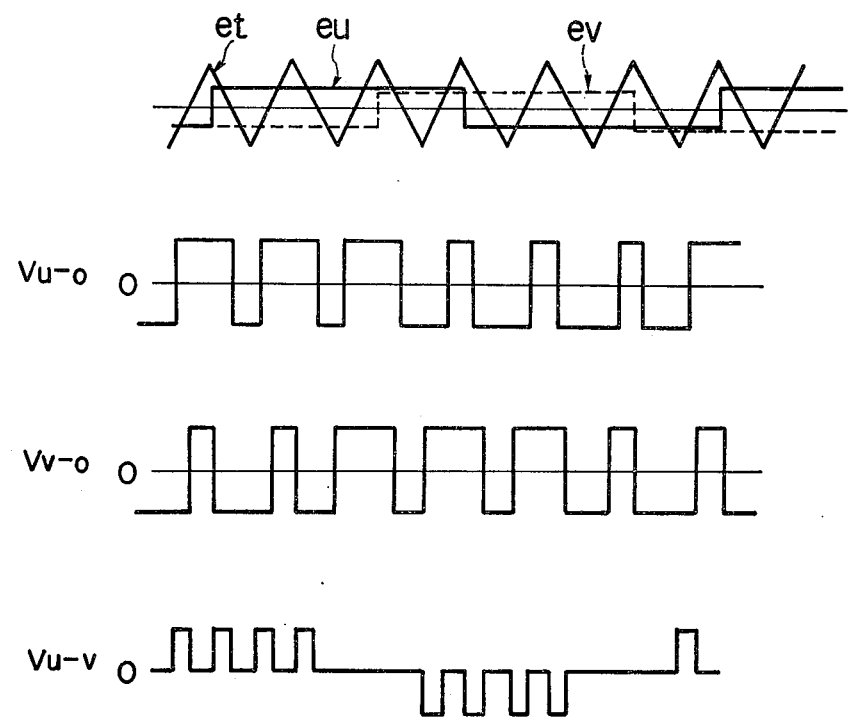
FIGS. 4A and 4B are waveform diagrams showing operation of a PWM inverter bridge.
Figure 4B:
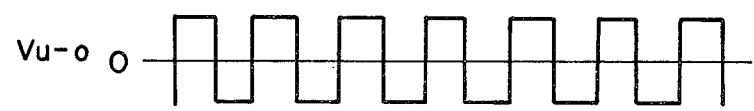

In FIG. 4A, a signal $e_t$ represents a triangular wave signal delivered from a triangular wave generator 113 to a wave synthesizing circuit 112 in the control circuit 14A to be used for the PWM mode of operation. Signals $e_u$ and $e_v$ are obtained in the wave synthesizing circuit 112 by synthesizing a frequency reference voltage signal f* delivered from an operational amplifier 104 (FIG. 6) with an output frequency $f_s$ delivered from a V/F converter 111. In the PWM operation, the signals $e_u$ and $e_v$ are compared with the triangular wave signal $e_t$, and the resultant conduction control signals are delivered from the control circuit 14A to the base drive circuits 24b–24e for controlling the bases of the transistors 41–46 of the inverter bridge 4. Since the PWM operation is well-known in the art, description in further detail will be omitted.

As a result of the above described PWM operation, the potential differences between the mid-potential point O and the U phase terminal U and the V phase terminal V on the AC side of the inverter bridge 4 are represented by voltage waves $V_{u-o}$ and $V_{v-o}$ shown in FIG. 4A, respectively, and the line-to-line voltage between the U phase and the V phase of the electric motor 5 is represented by a voltage wave $V_{u-v}$ in FIG. 4A which is well known in the art of the PWM control.

The absolute value of the slice level of the signals $e_u$ and $e_v$ compared with the triangular wave signal $e_t$ is adjusted to be in proportion to the frequency reference voltage signal f*. Thus, when the voltage signal f* varies, the height of the voltage wave $V_{u-v}$ is not varied, but the pulse width of the same wave $V_{u-v}$ is varied, thus enabling V/F control of PWM when the frequency reference voltage signal f* becomes zero, the voltage wave $V_{u-o}$ turns to be a signal deflecting symmetrically around the zero voltage as shown in FIG. 4B.

The present invention utilizes the fact that the voltage between the mid-potential point O and a terminal, e.g. U, on the AC side of the inverter bridge 4 exhibits an AC voltage which can be kept constant regardless of the output voltage or the frequency of the inverter.

The operation of the preferred embodiment shown in FIGS. 5 and 6 will now be described.

When the AC power source 1 is in the normal state, the powers required for the control circuit 14A and the drive circuits 24b–24e are supplied through both of the transformers 6 and 26.

When an instantaneous power failure occurs in the AC power source 1, the voltages across the secondary windings of the transformer 6 and therefore the power supplied through the rectifiers 20a–20e are abruptly reduced to zero. However, the voltage $V_{u-o}$ appearing between the mid-potential point O and the terminal U is kept applied across the primary winding 26p of the transformer 26, and the power required for the control circuit 14A and the drive circuits 24b–24e are supplied through the transformer 26 and the rectifiers 25a–25e.

Upon detecting the power failure the detector 27 delivers a power failure detecting signal to the control circuit 14A. The switch operating circuit 117 in the control circuit 14A then operates the switches 117A1 and 117A2 so as to transfer the operation of the inverter system from its normal operation with a variable frequency control to an operation maintaining constant the voltage $V_{u-o}$ as detected by the voltage detecting circuit 28. Since the energy recovered from the motor 5 is correlated to the rate of reduction of the rotating speed of the motor 5, the aforementioned operation maintaining the voltage $V_{u-o}$ constant can be realized by controlling the operating frequency of the inverter bridge 4 in such manner in which the rate of reduction of the frequency is varied in accordance with the detected voltage (hence, in effect, in correlation with the power consumed in the control circuit).

The amplitude of the voltage wave $V_{u-o}$ corresponds to the voltage across the capacitor 3, and hence the afore-mentioned operation is equivalent to an operation maintaining the voltage across the capacitor 3 constant. Since the reduction of the voltage across the capacitor 3 is caused by supply of power to control circuit 14A and drive circuits 24b–24e through the transformer 26, the maintenance of the capacitor voltage at a constant value can be realized by supplementing by regeneration of an electric power from the momentum of the electric motor 5.

The regeneration of the electric power from the momentum of the motor 5 is realized by utilizing the reactances of the three phase windings of the electric motor 5. By having the transistors of the arms of the inverter bridge 4 closed in an appropriate manner shortcircuit currents are made to flow through the three phase windings of the motor 5 and are then interrupted abruptly, thus creating charging currents of a pulse form to flow through the diodes 41A–46A into the capacitor 3. The above described power regenerating procedure is well-known in the art, and further description thereof will be omitted.

The voltage across the capacitor 3 and the voltage applied to the primary winding of the transformer 26 are maintained at constant values as described above so far as the momentum of the electric motor 5 remains within a practically utilizable range.

When the AC power source 1 recovers, the voltage detecting circuit 27 detects the recovery of the power source 1, and returns the operation of the control circuit 14A to its normal frequency controlling operation. Then the operating frequency of the inverter bridge 4 is increased automatically to a predetermined value, and the normal operation of the inverter system is thereby resumed.

Referring to FIG. 6, when the AC power source 1 is in its normal state, an output voltage of the transformer 6 is applied to the voltage detecting circuit 27. The rectifier 270 converts the output voltage into a DC voltage which is applied across the capacitor 271 and the resistor 272. The voltage comparator 273 compares the DC voltage with a predetermined value. When the comparator detects that the DC voltage is higher than the predetermined value, it delivers "power source normal" signal to the switch operating circuit 117 in the control circuit 14A. The switch operating circuit 117 thus operates to open the switches 117A1 and 117A2. The opening of the switches 117A1 and 117A2 permits the normal operation of the inverter system in accordance with a frequency preset in the frequency setting device 100.

When a power failure occurs in the AC power source 1, the DC voltage produced in the voltage detecting circuit 27 is reduced to a level lower than the predetermined value. The comparator 273 thus delivers "power failure" signal which operates the switch operating circuit 117 to close the switches 117A1 and 117A2. Upon closure of the switch 117A1, the output signal from the operational amplifier 102 is reduced to zero, while the output signal from the operational amplifier 103 is held in the capacitor 110, and the frequency reference signal f* delivered from the operational amplifier 104 is brought into the holding state.

Simultaneous closure of the switch 117A2 permits the application of the output of the voltage control amplifier 118 through input resistor 116 to the input of the operational amplifier 103. The voltage control amplifier 118 compares the regenerative voltage as detected by the voltage detecting circuit 28 with a regenerative voltage reference signal 120 to produce a deviation signal, and operates in combination with the amplifiers 103 and 104, to reduce the deviation closer to zero. The voltage detecting circuit 28 receives the voltage $V_{u\text{-}o}$ through the transformer 26, and thus indirectly detects the voltage across the capacitor 3 for the purpose of detecting the regenerative voltage.

Now, the polarities of various signals which appear in the control circuit 14A will be considered. When the inverter system is operated at a desired frequency in a steady state, the polarity of the output of the frequency setting device 100 is positive (+), and the polarities of the output signals from the operational amplifiers 102, 103 and 104 are negative (−), positive (+) and negative (−), respectively. However, the input signal of the operational amplifier 102 indicative of a frequency difference becomes substantially zero, and the output of the operational amplifier 102 is also reduced to substantially zero. For this reason, the output signal of the operational amplifier 103 is held at a positive value and does not vary over a wide range because of the charge on the capacitor 110.

When a power failure is detected, the closure of the switch 117A1 forces the output of the operational amplifier 102 to be zero. However, the operational amplifier 102 has been operated under a condition providing an output signal substantially equal to zero as described hereinbefore, the closure of the switch 117A1 does not cause any abrupt change in the resultant frequency f* appearing at the output of the operational amplifier 104.

The voltage across the capacitor 3 tends to be reduced when the capacitor 3 is discharged for driving the electric motor 5. However, the output of the voltage control amplifier 118 is now connected to the input of the operational amplifier 103 through the switch 117A2 closed as described above, and when the output of the detecting circuit 28 representing the voltage across the capacitor 3 is lower than the regenerative voltage reference signal 120, the voltage control amplifier 118 delivers a positive output to the operational amplifier 103, which in turn reduces the frequency reference signal f* delivered from the operational amplifier 104. As a consequence, the operating frequency of the inverter bridge 4 is reduced, and the momentum of the motor 5 is used to provide regenerative power as described hereinbefore. The regeneration prevents lowering of the voltage across the capacitor 3 and maintains the voltage at a constant value.

Figure 7:
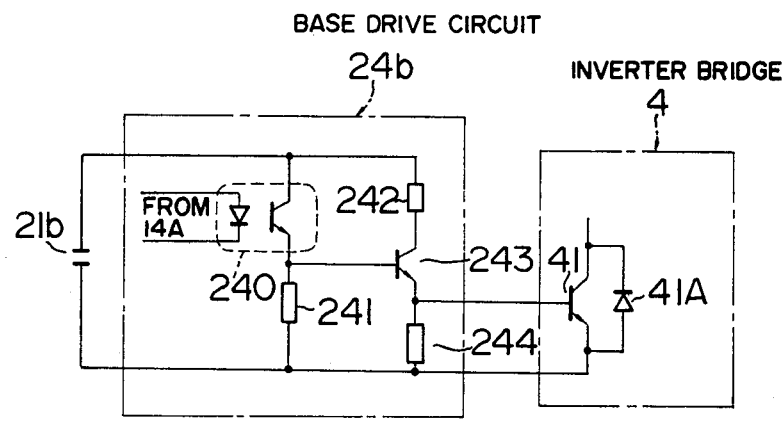
FIG. 7 is a diagram showing the internal construction of the drive circuit of the system shown in FIG. 5.

FIG. 7 illustrates an example of the base drive circuit 24b. The power required for the driving circuit 24b is supplied from the capacitor 21b. The base drive circuit 24b comprises a photocoupler 240 and a resistor 241 series-connected across the capacitor 21b, and a transistor 243 whose base is connected to the junction between the photocoupler 240 and the resistor 241. When an output from the control circuit 14A turns on the photocoupler 240, a voltage created across the resistor 241 conducts the transistor 243 and causes it to deliver a driving signal to the transistor 41 of the inverter bridge 4.

Various modifications can be made to the embodiment described above. Examples of the modifications are illustrated in FIGS. 8, 9 and 10.

Figure 8:
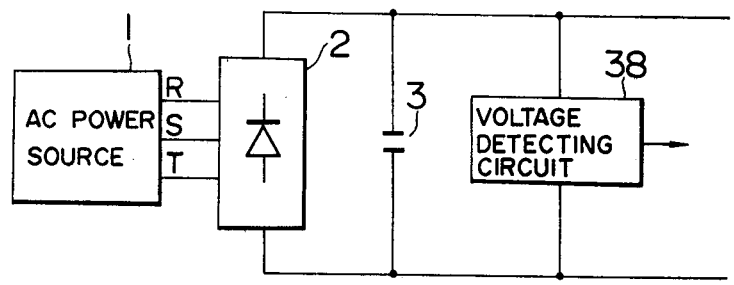
FIG. 8 is a diagram showing a modification of the voltage detecting circuit.

In a modification shown in FIG. 8, a voltage detecting circuit 38 is connected across the capacitor 3 for detecting the regenerative voltage directly out of the capacitor 3. The output of the voltage detecting circuit 38 can be used in place of the output of the voltage detecting circuit 28 shown in FIGS. 5 and 6.

Figure 1:
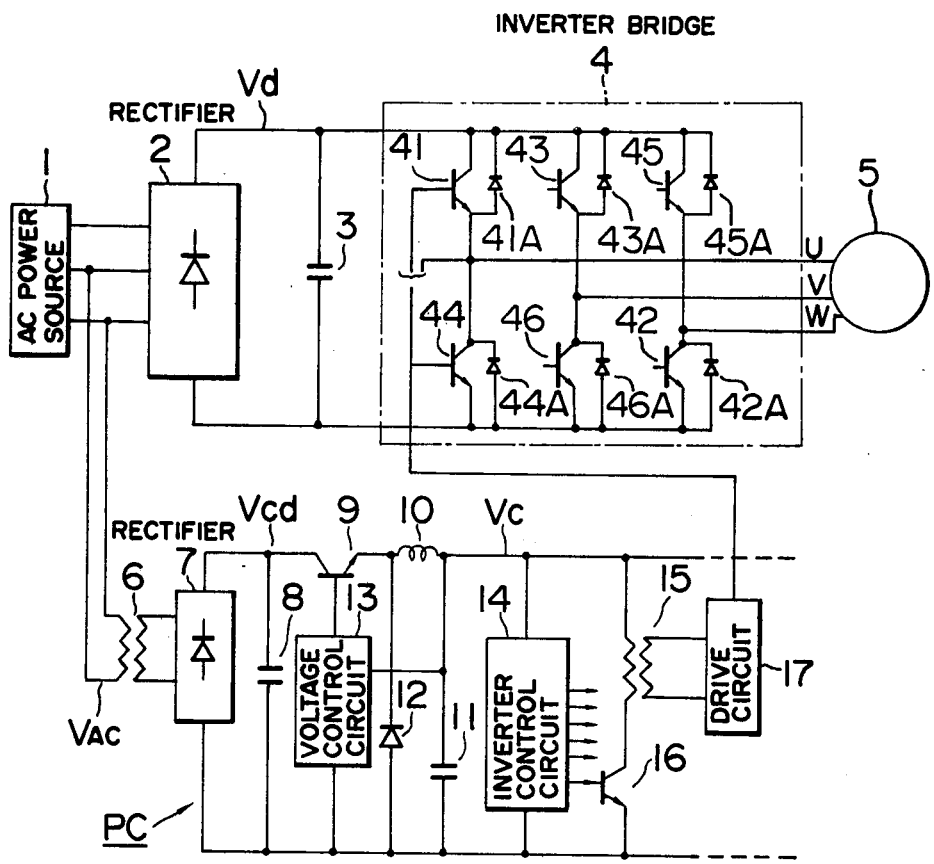
FIG. 1 is a block diagram showing a conventional inverter system.
Figure 9:
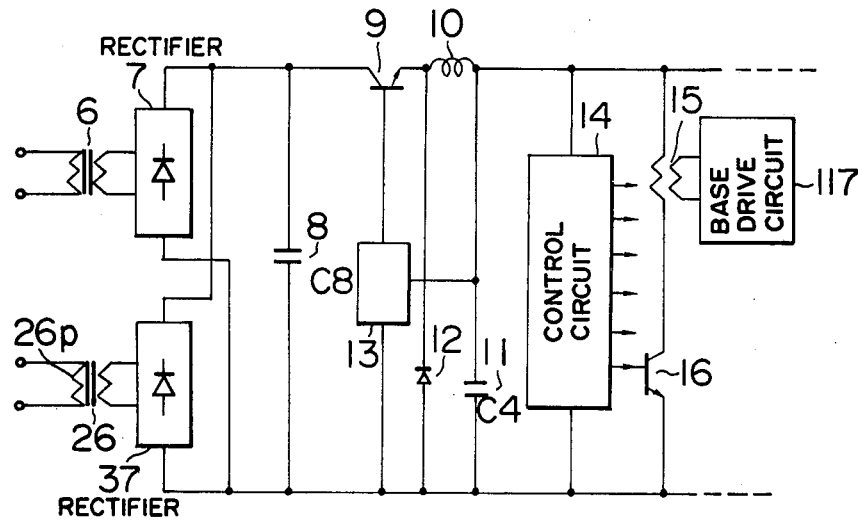
FIG. 9 is a diagram showing a modification of the control power circuit.
Figure 10:
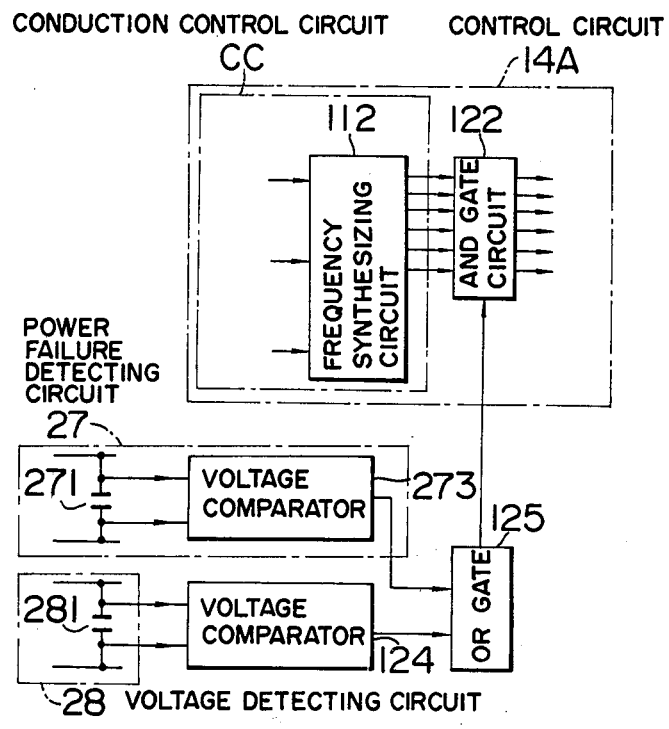
FIG. 10 is a diagram showing a protection circuit which can be added to the control circuit shown in FIG. 6.

In another modification shown in FIG. 9 the power control circuit PC is generally similar to that shown in FIG. 1 but the transformer 26 having its primary winding 26p connected between the terminal U and the mid-potential point O and a rectifier 37 for rectifying the output of the transformer 26 are added, with the DC terminals of the rectifier 37 being connected to the DC terminals of the rectifier 6.

The modification shown in FIG. 9 may further be modified in a manner such that the control circuit 14A is connected directly across the capacitor 8, while the constant voltage circuit comprising the circuit components 9, 10, 11, 12 and 13 are omitted for the simplification of the construction.

In the modification illustrated in FIG. 10, a protection circuit is provided which allows an automatic resumption of the inverter operation after a relatively long power failure during which the momentum of the electric motor is reduced to a level at which regeneration is practically impossible.

More specifically, a voltage comparator 124 compares the regenerative voltage detected by the voltage detecting circuit 28 with a predetermined value. When a power failure occurs, and the regenerative voltage is reduced to a range lower than the predetermined value, two inputs of an OR gate 125 and hence the output of the OR gate become "0". The output of the OR gate 125 is connected to a control gate of an AND gate circuit 122 provided to receive conduction control signal from the wave synthesizing circuit 112 of the conduction control circuit CC. When the momentum of the electric motor 5 is reduced to the low range described above, and the regenerative voltage is thereby reduced to a level lower than the predetermined value, the AND gate circuit 122 interrupts the operation of the inverter bridge 4. When the power supply of the AC power source 1 is resumed, the comparator 273 in the voltage detecting circuit 27 detects the resumption of the power source 1. The output of the OR gate 125 thus becomes "1", and the AND gate circuit 122 is enabled to permit passage of the conduction control signals, and the PWM voltage type inverter system restarts its operation. No restriction is imposed on the time length of the service interruption.

The invention has been described as it is applied to a three-phase system, but it should be noted that the invention is applicable to inverter systems of different number of phases.

In the embodiment described above, a single-phase regenerative voltage is derived between the terminals U and O but the arrangement may be such that three-phase regenerative voltages may alternatively be derived between each of the terminals U, V, W and the terminal O. In this case, the transformer 26 should be of three-phase.

In place of the capacitors 3A, 3B, any other means, e.g., a series connection of a pair of resistors, for providing a mid-potential point may be used.

The capacitor 3 may be omitted, in which case the capacitors 3A and 3B should have additional capacitance to provide, in place of the capacitor 3, adequate smoothing function.

Figure 11:
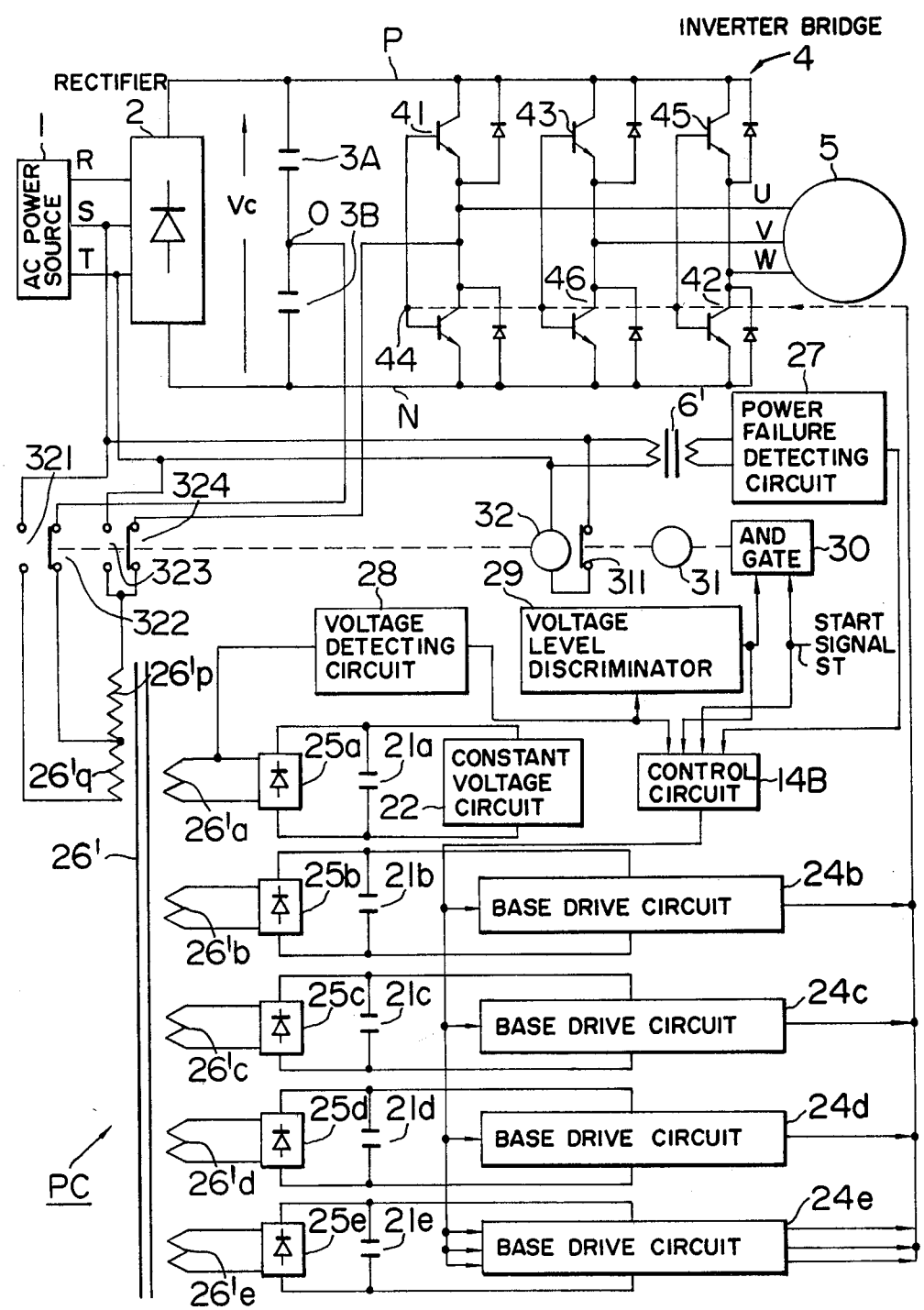
FIG. 11 is a block diagram showing another embodiment of an inverter system according to the invention.
Figure 12:
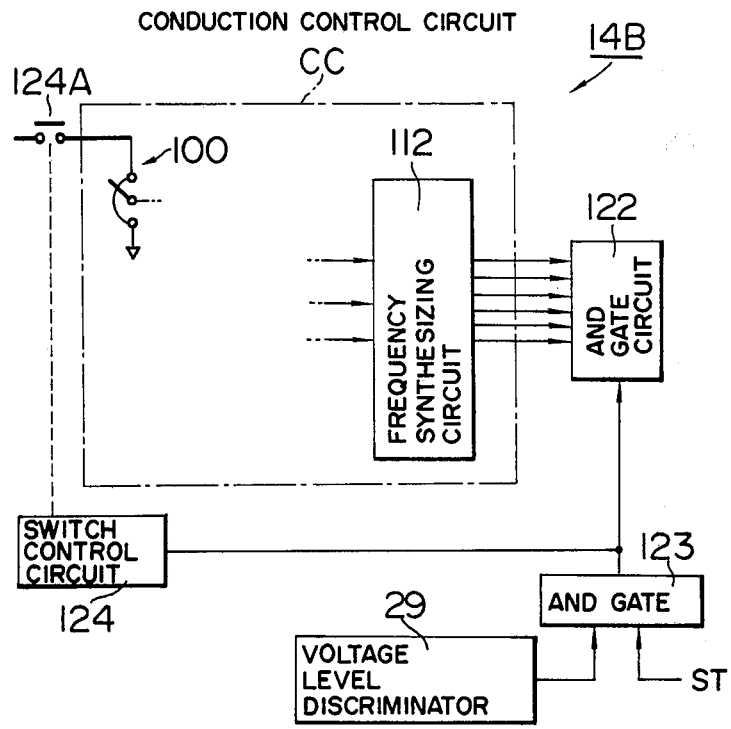
FIG. 12 is a diagram showing the control circuit of the system shown in FIG. 11.

FIG. 11 shows another embodiment of the invention. FIG. 12 shows the detail of part of the arrangement shown in FIG. 11. In this embodiment, a transformer 6' couples the power failure detecting circuit 27 to the terminals S and T of the AC power source 1. A transformer 26' has two primary windings 26'p and 26'q. The first primary winding 26'p is connected through a pair of normally-closed contacts 322 and 324 of a magnetic relay 32 to the terminals O and U. The second primary winding 26'q is connected through a pair of normally-open contacts 321 and 323 of the relay 32 to the terminals S and T. The number of turns of the first primary winding 26'p is twice that of the second primary winding 26'q since the peak value of the voltage between the terminals U and O is half that of the voltage between the terminals S and T.

A voltage level discriminator 29 is responsive to the voltage detecting circuit 28, and produces an output signal when the detected voltage level is above a predetermined value.

An AND gate 30 receives the output signal from the voltage level discriminator 29 and a start signal ST which is produced, by means not shown, when it is desired or commanded that the motor 5 be driven.

A magnetic relay 31 is energized when the output of the AND gate 30 is at a "high" level.

The magnetic relay 32 is connected through a normally-closed contact 311 of the relay 31 to the terminals S and T.

An AND gate 123 shown in FIG. 12 receives the output signal from the voltage level discriminator 29 and the start signal ST.

An AND circuit 122 receives the conduction control signal from the conduction control circuit CC and permits the passage thereof when the output signal of the AND gate 123 is at a "high" level.

A switch control circuit 124 closes a normally-open contact 124A when the output signal of the AND gate 123 is at a "high" level.

When the inverter system is in the state of standing-by or of preparation for operation, the start signal ST is not present. As a result, the relay 31 is not energized and the normally-closed contact 311 is closed, so that the relay 32 is energized. The primary of the transformer 26' is therefore connected to the AC power source 1. On the other hand, the output signal of the AND gate 123 is at a "low" level, so that the AND gate circuit 122 is disabled, i.e., it does not permit the passage of the conduction control signals. Moreover, the contact 124A of the switch control circuit 114 is open, so that the magnitude of the frequency reference signal becomes zero.

When the start signal ST is produced or becomes "high" at a time point $t_1$ in FIG. 13, the relay 31 is energized and the normally-closed contact 311 is opened, so that the relay 32 is deenergized at $t_2$ to switch the primary of the transformer 26' to be connected to the terminals U and O. Thus, during operation of the inverter system, the control circuit is powered by the output of the rectifier 2. On the other hand, the output signal of the level discriminator 29 is at "high" level and hence the output signal of the AND gate 123 is at "high" level. As a result, the AND gate circuit 122 is open or in the state in which it permits the passage of the conduction control signal, while the contact 124A of the switch control circuit 124 is closed. The frequency reference f* is then increased and the motor 5 is accordingly accelerated. At $t_3$, the inverter frequency reaches the set value.

When the service interruption detecting circuit 27 detects service interruption at $t_4$, the stats of the relays 31 and 32 are unchanged. But, in the same manner as in the embodiment shown in FIGS. 5 and 6, the voltage between the terminals U and O which is proportional to the DC voltage Vd of the inverter main circuitry is detected, and the frequency of the inverter bridge operation is adjusted so as to keep the DC voltage constant. As a result, the inverter frequency is gradually lowered as the energy of the rotating body is transformed and supplied to the capacitor 3.

When the speed of the motor 5 is decreased and approaches zero, the DC voltage of the inverter main circuitry is lowered. As a result, the output of the voltage level discriminator 29 becomes "low", as does the output of the AND gate 123. The AND gate circuit 122 will then block the conduction control signals and the inverter bridge 4 stops operation. On the other hand, the contact 124A is open, so that the magnitude of the frequency reference signal becomes zero. At the same time, the relay 31 becomes deenergized.

When the service is restored at $t_5$, the output signal of the discriminator 29 becomes "high", and, if the start signal ST is present, the relay 32 becomes energized and the contacts 321, 323 are closed. The inverter frequency reference f* is then increased until it reaches the set value at $t_6$. In this way, the inverter system automatically re-starts when the service is restored, as long as the start signal ST is present.

In the embodiment shown in FIGS. 11 and 12 as long as the inverter system is in operation, the relay 32 is deenergized so that the control circuit is powered by the voltage from the terminals U and O, even when the AC power source is supplying a voltage. But the arrangement may be such that the relay 32 is energized when the AC power source is supplying a voltage and is deenergized upon power failure.

The relay contacts 321-324 in FIG. 11 may be replaced by any other switching means with switching control means, in place of the relay 32, for controlling the switching means so as to obtain the same effects as with the relay 32 and its contacts 321-324.

Figure 14:
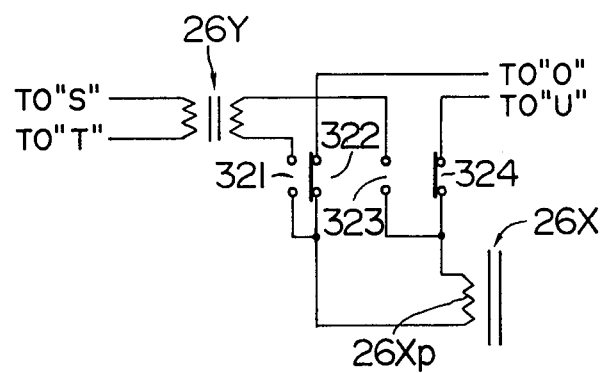
FIG. 14 is a diagram showing a modification of the transformer arrangement.

In place of the transformer having a first and a second primary windings, combination of transformers as shown in Fig. 14 may be used. In this modification, the transformer 26X whose secondary windings, not shown, are used in place of the secondary windings 26'a-26'e of FIG. 11, has a single primary winding 26Xp which is connected through a pair of contacts 322, 324 to the terminals O and U, and also through a pair of contacts 321 and 323, and through a transformer 26Y to the terminals S and T. The contacts 321-324 operate in the same manner as described with reference to FIG. 11. The transformer 26Y is used to equalize the secondary voltage of the transformer 26X irrespective of whether the contacts 322 and 324 are closed or the contacts 321 and 323 are closed.

Any other combination or arrangement which receives, as a first input, the voltage from the terminals O and U and, as a second input, the voltage from the terminals S and T, and selectively transforms either the first input or the second input may be used in place of the single transformer 26' or the combination of the transformers 26X and 26Y. Such an arrangement will be referred to as transforming means in the appended claim.

Moreover, modifications similar to those described in connection with the embodiment shown in FIGS. 5 and 6 may be made to the embodiment shown in FIGS. 11 and 12.

As has been described, the invention provides a system wherein regenerative voltage is used to power the control circuit so that, upon power failure, the control power voltage is kept constant over a longer period of time than in the conventional system.

Moreover, with the additional circuit for interrupting and restarting the operation of the inverter system, interruption and restart are achieved in a safe manner. Accordingly, the inverter system according to the invention is reliable and eliminates the necessity of attendance of a human operator.

What is claimed is:

1. A PWM voltage type inverter system comprising:
a rectifier connected to an AC power source to receive an AC power therefrom and convert it into a DC power,
an inverter bridge connected to receive the DC power from the rectifier and converting it into an AC power of a variable frequency to supply it to an AC motor,
a conduction control circuit for controlling the conduction of arms of the inverter bridge normally in a first mode wherein it operates at a frequency determined by a frequency reference signal,
a control power circuit connected to receive the power from the AC power source and the regenerative AC power from the motor and to supply a constant voltage DC power to the conduction control circuit,
power failure detecting means for detecting the power failure of the AC power source, and
switching means responsive to the power failure detecting means for switching, when power failure is detected, the conduction control circuit to a second mode, wherein it operates in such a manner as to maintain the regenerative voltage at a predetermined value.

2. A system as set forth in claim 1, further comprising a voltage detecting means for detecting the magnitude of the regenerative voltage, and means for comparing the detected regenerative voltage with a predetermined voltage reference to produce a deviation signal, wherein said conduction control circuit operates, when it is in said second mode, to control the frequency of the inverter bridge so as to make the deviation closer to zero.

3. A system as set forth in claim 1, further comprising means for providing a mid-potential point between the DC terminals of the inverter bridge, wherein said control power circuit receives the regenerative AC voltage between one or more of the AC terminals of the inverter bridge and the mid-potential point.

4. A system as set forth in claim 3, wherein the control power circuit comprises a first transformer having at least one primary winding connected to one of the AC terminals of the inverter bridge and said mid-potential point, a first rectifier for converting the AC output from a secondary winding of said first transformer into DC power to energize the conduction control circuit, a second transformer having a primary winding connected to said AC power source and second rectifier for converting the AC output from a secondary winding of said second transformer into DC power to energize the conduction control circuit.

5. A system as set forth in claim 3, wherein the control power circuit comprises transforming means receiving, as a first input, the voltage from between the AC terminals of the inverter bridge and said mid-potential point, and, as a second input, the voltage from the AC power source, and selectively transforming either the first input or the second input, a rectifier for converting the AC output from the transforming means into DC power to energize the conduction control circuit, and switching means for causing the transforming means to transform the first input at least when the power failure is detected.

6. A system as set forth in claim 5, wherein said switching means causes the transforming means to transform the first input as long as the magnitude of the regenerative voltage is not smaller than a predetermined value.

7. A system as set forth in claim 5 or 6, further comprising means for reducing to zero the frequency reference signal to the conduction control circuit when the AC voltage supplied to the control power circuit is smaller than a predetermined value.

8. A system as set forth in claim 1, further comprising an AND gate circuit adapted to receive the conduction control signals from the conduction control circuit and permit passage thereof when the AC voltage supplied to the control power circuit is not smaller than a predetermined value.

* * * * *